Oct. 21, 1952 S. S. SLYK 2,614,734

SHAKER-DISPENSER

Filed July 26, 1950

*INVENTOR:*
STANLEY S. SLYK

BY Rummler, Rummler & Snow

ATT'YS

Patented Oct. 21, 1952

2,614,734

UNITED STATES PATENT OFFICE 2,614,734

SHAKER-DISPENSER

Stanley S. Slyk, Chicago, Ill., assignor of one-half to Frederick J. Spencer and Edward Spencer, both of Chicago, Ill.

Application July 26, 1950, Serial No. 175,975

10 Claims. (Cl. 222—565)

This invention relates to shakers, such as salt shakers, and similar devices for sprinkling granular condiments which have a tendency to absorb moisture and become sticky or to cake; and particularly to improvements in the construction of perforated ends of such devices through which the material is dispensed.

The main objects of this invention are to provide an improved shaker which will readily dispense salt or the like whether or not the material is damp or caked; to provide an improved construction for the dispensing end of shaker devices; to provide such a device having a multiplicity of shearing edges which automatically separate granules of the material being dispensed for discharge through the shaker openings; to provide an improved dispensing portion for shakers in which each opening or perforation is provided with a shearing element for edgewise engagement with the mass of material in the shaker; to provide such a device which automatically controls the direction of the material dispensed as it leaves the shaker; and to provide an improved non-clogging shaker that is simple in construction and extremely cheap to manufacture.

A specific embodiment of this invention is shown in the accompanying drawings in which.

Figure 1:
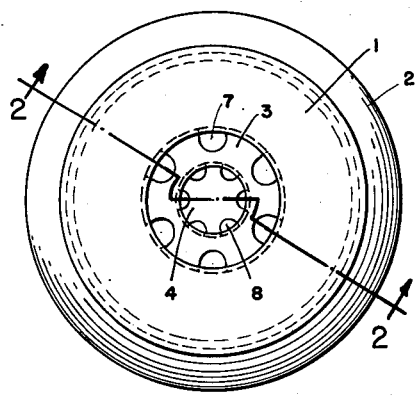
Figure 1 is a top plan view of a shaker having a separable dispensing cap in which the improved construction is employed.

The problem of providing a shaker-dispenser that will not clog in humid weather and which will dispense materials such as salt, whether or not the materials are damp or caked, has long been recognized and many attempts to provide adequate shaker devices have been made. However, previous devices, employing strictly mechanical means, have depended entirely upon the action of fixed bars, pins, posts or other means, disposed to intercept the mass of the material within the shaker and break it up before it reaches the discharge or dispensing openings. Such arrangements, while perhaps suitable for caked material, result in additional clogging of the shaker head when the material is damp or sticky, and, therefore, offer only a partial, often ineffective, answer to the problem. Other previous shaker devices have employed chemical or moisture absorbing means intended to keep the material in the shaker dry and to prevent caking; however, in these devices the moisture absorbing means must be periodically dried or replaced and inattention is apt to result in inoperativeness. The present invention is intended to solve the problem by purely mechanical means.

In the form shown in the drawings, the invention is applied to a detachable shaker cap 1, adapted for threaded engagement over the open end of a container 2, in the usual and well-known manner, and as shown, the improved construction is in that portion of the shaker cap which contains the perforations or dispensing openings. The cap and the container may be made of any suitable materials and formed by any suitable means; and it will be understood that the dispensing end of the shaker may be either separable, as shown, or an integral part of the container body.

Figure 2:
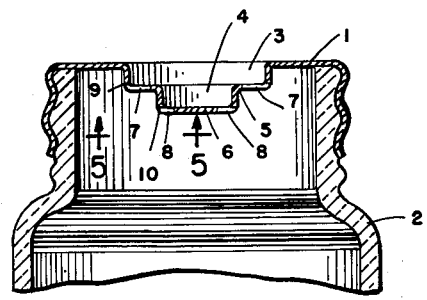
Fig. 2 is a sectional view of the same as taken on line 2—2 of Fig. 1.
Figure 5:
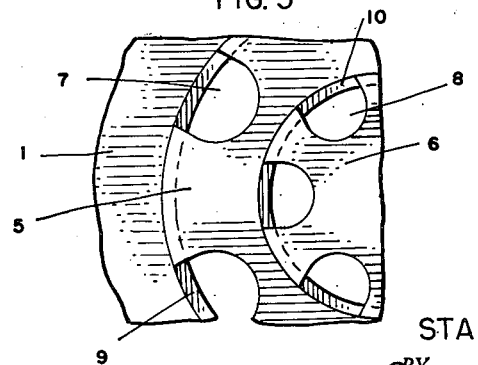
Fig. 5 is an enlarged fragmentary bottom side view of the dispensing cap shown in Figs. 1 and 2, the view being taken as on line 5—5 of Fig. 2.

As shown in Figs. 1, 2 and 5, the improved shaker head is annular in shape and is formed with two concentric inwardly extending cup-like depressions 3 and 4, one within the other, which, on the inner side of the shaker head, have a stepped configuration providing a pair of substantially flat annular shoulders or ledges 5 and 6, substantially normal to the shaker axis and each about one-eighth to one-quarter inch high according to the shaker size. The perforations or dispensing openings 7 and 8 are formed in these ledges or shoulders, respectively, and are located to intersect the outer edges of the ledges, as shown in Fig. 5. Preferably, the openings or perforations are substantially semi-circular so that the edges 9 and 10 of the axially extending side walls of the ledges, which form the outer margins of the openings 7 and 8, will have a maximum length and yet permit the openings to be of adequate area or size for the material to be dispensed. The size of these openings may be as desired; however, the openings should not be substantially larger than what would be normal for dispensing the material when in its ordinary dry, free-running state.

Figure 3:
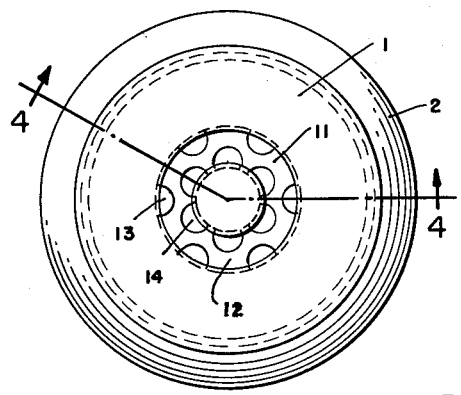
Fig. 3 is a top plan view, like Fig. 1, showing a shaker having a modified form of the improved dispensing cap.
Figure 4:
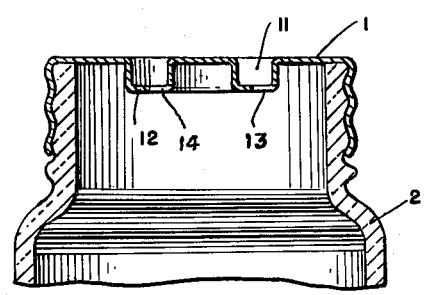
Fig. 4 is a sectional view of the same as taken on line 4—4 of Fig. 3.

In the modified form shown in Figs. 3 and 4, the dispenser head or cap 1 is formed with an annular, centrally located, flat-bottomed channel 11, which, on the inside of the dispenser head, provides a ring-like, inwardly projecting ridge or boss 12. In this form the perforations 13 and 14 are disposed along both the inner and outer margins of the ridge 12 and are made to intersect the edges of the ridge in the same manner as the perforations 7 and 8 shown in Fig. 5. Preferably, the inner perforations 14 are staggered relative to the outer perforations 13 in order to provide the maximum number of openings in the ridge surface. As in the case of the form shown in Fig. 5, the axially extending edges of the ridge side walls form the outermost margin of each of the openings 13 and 14.

In either of the forms of the invention herein shown, the edges of the side walls, which form part of the periphery of each of the dispensing openings, provide knife-like shearing portions against which the material to be dispensed is thrown during the shaking or dispensing operation. These edges serve to cut off and separate the crystal or grains of the material, as inertia carries the material mass beyond the corners of the edges, which grains then pass through the openings to be dispensed or sprinkled in the usual manner. This process is repeated each time the shaker is manipulated with the usual up and down shaking motion, and, each time the mass or body of the material in the shaker is thrown to the shaker head and against the corners of the shoulders, a shearing or cutting action occurs at each of the dispensing openings. The result is that, even though the material being dispensed is damp or caked, the shaker head openings will not become clogged and the material will be delivered uniformly.

Also, because the shoulders or ledges on the inside of the shaker head are usually formed by an inward depression on the outside of the head, the exterior walls of the formed portion serve to direct the spray of the dispensed material in the direction of the shaker axis and prevent the material from scattering laterally over a wide area, as is a common occurrence with ordinary shaker devices.

The main advantages of this invention reside in the construction of the areas in which the perforations are formed in the shaker head whereby each opening has a relatively sharp corner edge as a part of its boundary and thus functions like the end of a hollow punch to separate small portions of material from a mass; in the fact that the material to be dispensed will be delivered regularly even though it be sticky, in lumps, or caked, as is often the case with ordinary table salt; and in the construction wherein the perforated area is depressed and hence protected against becoming soiled or bent.

Other advantages lie in the simplicity of the improved shaker construction whereby the device may be manufactured easily and cheaply and hence sold at a relatively low cost.

Although two specific embodiments of this invention are herein shown and described it will be understood that details of the construction shown may be altered or omitted without departing from the spirit of this invention as defined by the following claims.

I claim:

1. A shaker comprising a hollow body having an end wall, an inwardly projecting portion on said end wall spaced from the sides of the body and having a pair of angularly disposed intersecting surfaces one of which is inwardly facing, and the inwardly facing surface of said portion having a plurality of perforations each of which is partially bounded by the edge of the other surface.

2. A shaker comprising a hollow body having an end wall provided with an inwardly projecting portion spaced from the sides of the body, said portion having a flat surface substantially normal to the body axis and a side wall extending from said flat surface toward the said end wall, said flat surface having a plurality of perforations, and each of said perforations having the adjacent edge of said side wall as a portion of its periphery.

3. A shaker comprising a hollow body having an end wall, an inwardly projecting portion on said end wall having angularly disposed surfaces meeting to provide an inwardly facing shoulder substantially normal to the axis of the body and a side wall extending in the axially outward direction from said shoulder, and the surface of said shoulder having a plurality of perforations each of which is partially bounded by the edge of said side wall.

4. A shaker comprising a hollow body having an end wall, angularly disposed surfaces on the inner side of said end wall meeting to provide a plurality of inwardly facing shoulders, each of said shoulders being substantially normal to the axis of the hollow body and the respective meeting surface providing a side wall extending in the axial direction from the shoulder, and the surface of each of said shoulders having a plurality of perforations each of which is partially bounded by the edge of the respective shoulder side wall.

5. A shaker comprising a hollow body having an end wall, said end wall having a depression in its outer surface and a coincident projection on its inner surface, said projection having an inwardly facing surface and a side wall extending axially therefrom, and said inwardly facing surface having a plurality of perforations each of which is partially bounded by the edge of said side wall.

6. A shaker comprising a hollow body having an end wall, said end wall having a pair of concentric depressions in its outer surface, one within the other, the inner depression being of smaller area and greater depth than the outer depression, and the inner side of said end wall having concentric inwardly projecting portions coincident with said depressions and providing inwardly facing shoulders each having an axially extending side wall, said shoulders each having a plurality of perforations each of which is partially bounded by the edge of the respective side wall.

7. A shaker comprising a hollow body having an end wall, said end wall having a channel in its outer surface and a ridge-like projection on its inner surface directly opposite said channel and of substantially the same contour, said projection having an inwardly facing surface and side surfaces extending toward said end wall, and said inwardly facing surface having a plurality of perforations each of which is located to be partially bounded by the edge of one of the said side surfaces.

8. As an article of manufacture, a shaker head comprising a cover member for detachable mounting on the opening end of a container body, said cover member having an axially projecting portion on its inner side which portion has an axially extending side surface and an axially facing shoulder surface, and said projecting portion having a plurality of axially opening perforations in its shoulder surface each of which is partially bounded by the adjacent edge of said side surface.

9. As an article of manufacture, a shaker head comprising a cover member for detachable mounting on the open end of a container body, and an axially projecting portion on the inner side of said cover member terminating in an inwardly facing surface and having a side surface extending in the axial direction from the margin of said inwardly facing surface toward the plane of said cover member, said inwardly facing surface having a plurality of axially opening perforations therein each of which is partially bounded by the adjacent edge of said side surface.

10. A shaker comprising a hollow body having an end wall, an inwardly projecting portion on said end wall spaced from the sides of the body and having a pair of angularly disposed intersecting surfaces, one of said surfaces having a plurality of perforations each of which is partially bounded by the edge of the other surface at the line of intersection of said surfaces.

STANLEY S. SLYK.

REFERENCES CITED

The following references are of record in the file of this patent:

UNITED STATES PATENTS

| Number | Name | Date |
| --- | --- | --- |
| 780,292 | Jones | Jan. 17, 1906 |
| 1,243,836 | Hawkes | Oct. 23, 1917 |
| 1,411,594 | Sweet | Apr. 4, 1922 |